United States Patent
Jang et al.

(10) Patent No.: US 8,108,017 B2
(45) Date of Patent: *Jan. 31, 2012

(54) PORTABLE TERMINAL

(75) Inventors: Chang-Yong Jang, Seoul (KR);
Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 529 days.

This patent is subject to a terminal disclaimer.

(21) Appl. No.: 12/242,277

(22) Filed: Sep. 30, 2008

(65) Prior Publication Data

US 2009/0286573 A1 Nov. 19, 2009

(30) Foreign Application Priority Data

May 14, 2008 (KR) .................... 10-2008-0044746

(51) Int. Cl.
*H04M 1/03* (2006.01)
*H04M 1/00* (2006.01)
*H04M 1/02* (2006.01)
*H04B 1/03* (2006.01)
*H04B 1/38* (2006.01)

(52) U.S. Cl. ............... 455/575.4; 455/566; 455/575.1; 455/575.3; 455/90.3; 455/128; 348/14.07; 348/376

(58) Field of Classification Search ........... 455/566, 455/347–349, 575.1–575.9, 90.1–90.3, 128; 16/221–252, 266, 274, 277, 284–297, 302–304, 16/319–342, 349–353, 366, 367; 348/14.02–14.03, 348/373–376; 345/905, 173
See application file for complete search history.

(56) References Cited

U.S. PATENT DOCUMENTS

| 7,225,002 | B2* | 5/2007 | Lee et al. | .............. 455/575.4 |
| 2005/0096082 | A1 | 5/2005 | Chang | |
| 2006/0053847 | A1* | 3/2006 | Taki et al. | .............. 70/247 |
| 2007/0243731 | A1* | 10/2007 | Im | .............. 439/131 |
| 2007/0243896 | A1* | 10/2007 | Maatta et al. | .............. 455/550.1 |
| 2007/0252202 | A1* | 11/2007 | Park et al. | .............. 257/335 |
| 2008/0052874 | A1 | 3/2008 | Liu | |
| 2009/0170573 | A1* | 7/2009 | Harmon et al. | .............. 455/575.4 |
| 2009/0170574 | A1* | 7/2009 | Harmon et al. | .............. 455/575.4 |
| 2009/0227301 | A1* | 9/2009 | Lindvall | .............. 455/575.4 |

FOREIGN PATENT DOCUMENTS

| CN | 1770786 A | | 5/2006 |
| EP | 1 916 826 A1 | | 4/2008 |
| JP | 2006186577 A | * | 7/2006 |
| JP | 2007-74411 A | | 3/2007 |
| KR | 10-2006-0031019 A | | 4/2006 |

* cited by examiner

*Primary Examiner* — Ajit Patel
*Assistant Examiner* — Erica Navar
(74) *Attorney, Agent, or Firm* — Birch, Stewart, Kolasch & Birch, LLP

(57) ABSTRACT

A portable terminal is provided where the portable terminal has an upper body including an upper surface and a lower surface, a lower body having an upper surface, the upper body being slidably connected to the lower body for movement between a closed position and an open position to expose a portion of the upper surface of the second body, and a first moving unit connected between the upper body and the lower body, the first moving unit being configured to permit tilting of the upper body with respect to the lower body such that a portion of the lower surface of the upper body is lower than the exposed portion of the upper surface of the second body.

18 Claims, 16 Drawing Sheets

US 8,108,017 B2

PORTABLE TERMINAL

CROSS-REFERENCE TO RELATED APPLICATION

The present invention claims priority to Korean Application No. 10-2008-0044746, filed on May 14, 2008, which is incorporated by reference in its entirety.

BACKGROUND OF THE INVENTION

1. Field of the Invention

The present invention relates to a portable terminal having an upper body and a lower body slidably coupled to each other, and more particularly, to a portable terminal having a first moving unit configured to move an upper body of the portable terminal with respect to a lower body of the portable terminal.

2. Description of Related Art

Generally, a portable terminal serves as a portable device providing one or more functions such as voice and video calls, information input/output, and data storage. Because portable terminals now provide many additional services besides basic call services, a user can capture photos or moving images, reproduce music or video, play games, receive broadcasting programs, and the like. As such, portable terminals are becoming multimedia players.

In order to implement complicated functions of the multimedia player, various improvements are being provided in the hardware or software implementation of the portable terminal. For instance, a user interface is provided to allow a user to easily and conveniently search or select functions of the portable terminal.

Furthermore, because the portable terminal is currently regarded as expressing a person's personality or taste, various designs such as a bar type, a slide type, a folder type, and a swivel type are being developed.

Recently, various attempts to provide not only the above structure but also a more convenient to operate user interface are being pursued.

BRIEF SUMMARY OF THE INVENTION

Therefore, it is an object of the present invention to provide a slide type portable terminal capable of moving an upper body with respect to a lower body in an up and down direction, and erecting the upper body with respect to the lower body in an open configuration.

To achieve these and other advantages and in accordance with the purpose of the present invention, as embodied and broadly described herein, there is provided a portable terminal having an upper body including an upper surface and a lower surface, a lower body having an upper surface, the upper body being slidably connected to the lower body for movement between a closed position and an open position to expose a portion of the upper surface of the second body, and a first moving unit connected between the upper body and the lower body, the first moving unit being configured to permit tilting of the upper body with respect to the lower body such that a portion of the lower surface of the upper body is lower than the exposed portion of the upper surface of the second body.

In accordance with another aspect of the present invention, a portable terminal is provided where the portable terminal includes an upper body having an upper surface and a lower surface, a lower body having an upper surface, the upper body being slidably connected to the lower body for movement between a closed position and an open position to expose a portion of the upper surface of the lower body, and a first moving unit connected between the upper body and the lower body to move at least a portion of the upper body in a second direction different from the first direction, the first moving unit being configured to move the portion of the upper body toward the lower body along the second direction when the upper body is moved from the closed position to the open position and to move the portion of the upper body away from the lower body along the second direction when the upper body is moved from the open position to the closed position. The first moving unit includes a support member, the upper body being pivotally connected to the support member, and a linkage operator connected to the upper body to pivot the upper body with respect to the lower body when the upper body moves between the closed position and the open position.

In accordance with still another aspect of the present invention, a portable terminal is provided where the portable terminal includes a lower body, an upper body connected to the lower body, the upper body being slidably moveable in a first direction with respect to the lower body between a closed position and an open position, a first moving unit connected between the upper body and the lower body to move the upper body in a second direction different from the first direction, the first moving unit being configured to move the upper body toward the lower body along the second direction when the upper body is moved from the closed position to the open position and to move the upper body away from the lower body along the second direction when the upper body is moved from the open position to the closed position, and a tilting unit connected between the first moving unit and the upper body, the tilting unit being configured to permit the upper body to tilt with respect to the lower body.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to portable terminals according to exemplary embodiments of the present invention and will be explained in more detail with reference to the attached drawings.

Figure 1A:
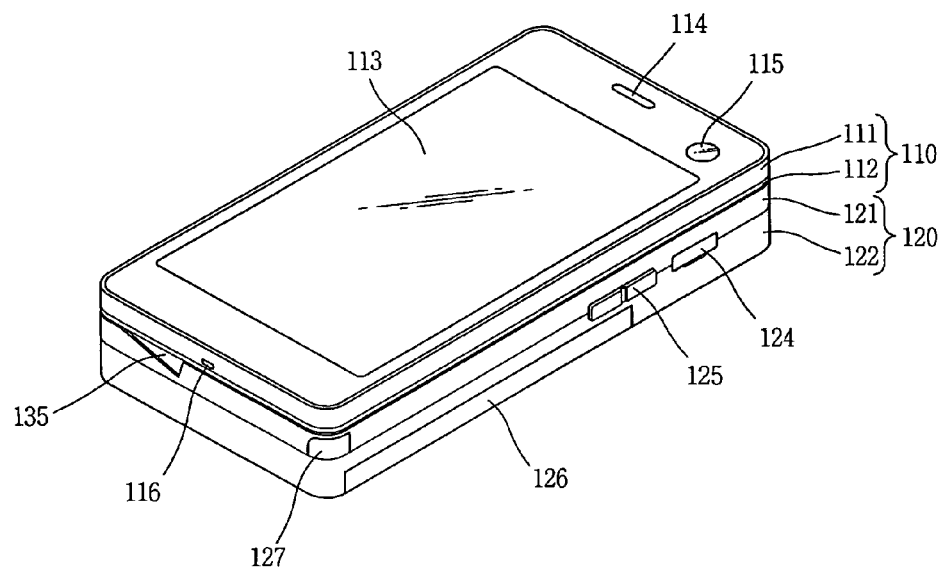
FIGS. 1A and 1B are front perspective views of a portable terminal in a closed position and an open position, respectively according to a first exemplary embodiment of the present invention.
Figure 1B:
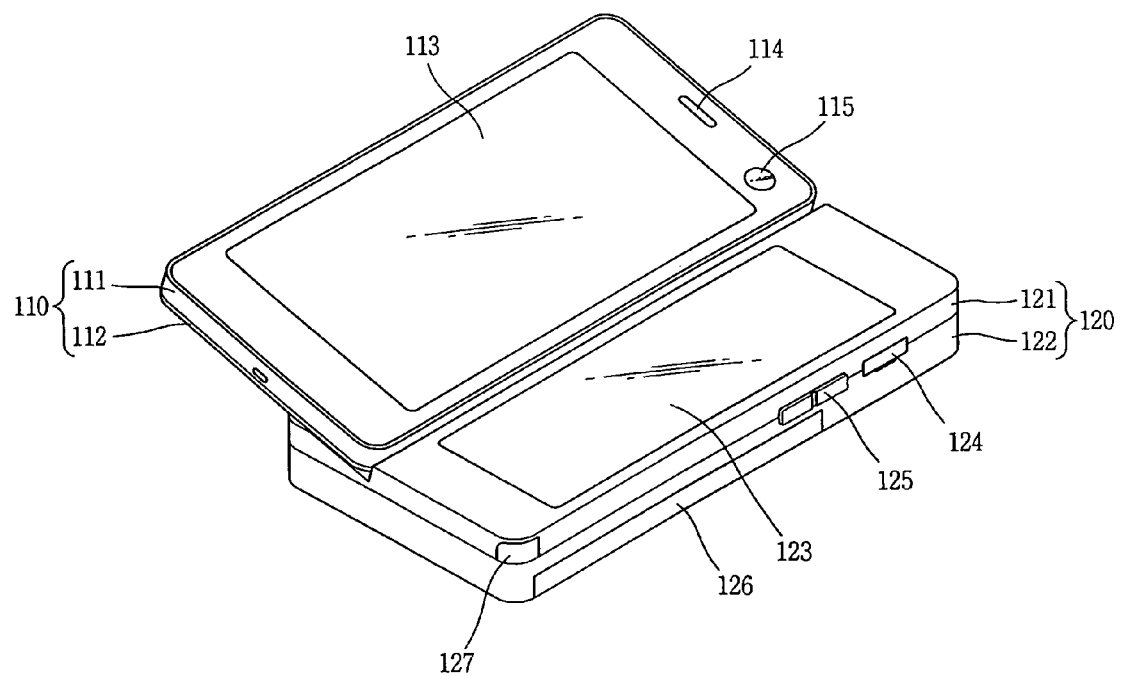

FIGS. 1A and 1B are front perspective views of a portable terminal 100 according to a first exemplary embodiment of the present invention. The portable terminal 100 includes an upper body 110 and a lower body 120 coupled to the upper body 110 so as to be slidable in a horizontal direction. As shown in FIG. 1A, when the portable terminal is in a closed position, the upper body 110 overlaps the lower body 120. As shown in FIG. 1B, when the upper body 110 is in an open position, the upper body 110 exposes at least one part of the lower body 120. The upper body 10 is coupled to the lower body 120 so as to be slidably movable in a width direction (lateral direction) of the lower body 120, and is configured so at least one part of the upper body 110 is configured to move up and down with respect to the lower body 120. Accordingly, when the portable terminal is in an open configuration, the upper body 110 is erected at a predetermined angle with respect to the lower body 120 such that a lower surface of the upper body 110 is lower than an exposed upper surface of the lower body 120.

The portable terminal 100 may be operated in a standby mode when in a closed configuration. However, the standby mode may be released by a user's manipulation. Also, the portable terminal 100 may be operated in a call mode, or other modes, in an open configuration. However, the call mode may be converted to the standby mode by a user's manipulation or after a certain time has elapsed without active use of the portable terminal 100. It is understood that the portable terminal 100 could be configured to provide different modes depending on the state of the portable terminal 100, such as the portable terminal being able to operate in call mode when the portable terminal 100 is in the closed position.

The upper body 110 includes a case having a front case 111 and a rear case 112. Various electronic components of the portable terminal 100 are mounted in a space formed between the front case 111 and the rear case 112. The cases 111 and 112 may be formed of injection-molding synthetic resins or a metallic material, such as stainless steel (STS) or titanium (Ti).

A first display unit 113, a first audio output unit 114, a first image input unit 115, an audio input unit 116, and so on may be disposed at the upper body 110 of the portable terminal 100, preferably, at the front case 111. The display unit 113 may include a liquid crystal display (LCD) module, an organic light emitting diodes (OLED) module, or other suitable displays. The display unit 13 may also include a touch screen or touch pad to allow a user to input information in a touch manner. The first audio output unit 114 may be a receiver or a speaker, and the first image input unit 115 may be a camera module to capture still or moving images by a user. The audio input unit 116 may be a microphone so as to input a user's voice or other sounds.

Similar to the upper body 110, the lower body 120 includes a front case 121 and a rear case 122. A second display unit 123 is disposed at the lower body 120, preferably, at a front surface of the front case 121. Similar to the first display unit 113, the second display unit 123 outputs visual information, and may be implemented as a touch screen for inputting information. The second display 123 is exposed when the upper body moves from a closed position to the open position.

On at least one of the front case 121 and the rear case 122, a manipulation unit 124, an interface 125, and other components may be disposed. The manipulation unit 124 receives a command to control operation of the portable terminal by a user's manipulation, and any type of manipulation unit may be adopted so long as it is manipulable by a user in a tactile manner. For example, the manipulation unit 124 may include a dome switch, a touch screen, or a touchpad configured to receive information or command by a user in a push or touch manner. Also, the manipulation unit 124 may be a wheel, a jog switch, or a joy stick.

The interface 125 provides a means through which the portable terminal of the present invention can exchange data with external devices. For instance, the interface 125 may include at least one of a connection terminal to be connected to an earphone by wire or by radio, a short-range communication port (e.g., IrDA port, BLUETOOTH port, wireless LAN port, and so on). The interface 125 may be configured as a card socket (e.g., for coupling to an external card such as a memory card to store information), a subscriber identity module (SIM) card, or a user identity module (UIM) card. In addition, the interface may be configured to cooperate with a power supply terminal for supplying power to the portable terminal 100.

A power supply unit 126 for supplying power to the portable terminal is located at the rear case 122 of the lower body 120. The power supply unit 126 may be a chargeable battery, and may be detachably coupled to the rear case 122 for charging.

A broadcasting signal receiving antenna 127 may be disposed at one side of the rear case 122. The antenna 127 may be installed at the lower body 120 so as to be drawn out from the lower body 120.

Figure 2:
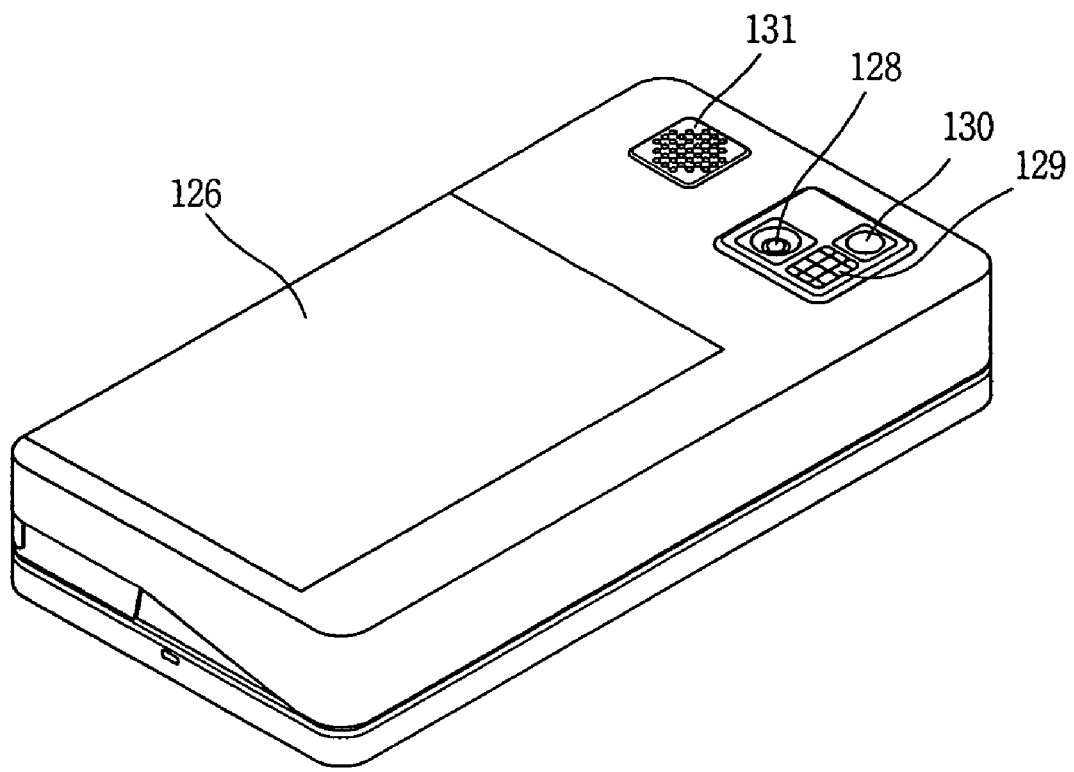
FIG. 2 is a rear perspective view of the portable terminal of FIGS. 1A and 1B.

FIG. 2 is a rear perspective view of the portable terminal of FIGS. 1A and 1B. As shown in FIG. 2, a second image input unit 128 is mounted to a rear surface of the rear case 122 of the lower body 120. The second image input unit 128 has a capturing direction opposite to that of the first image input unit 115 (refer to FIGS. 1A and 1B), and may be a camera having different pixels from the first image input unit 115. For instance, the first image input unit 115 preferably has a low number of pixels so that a user's face captured during a video call can be immediately transmitted to another party, while the second image input unit 128 preferably has a high number of pixels to capture still or moving images that are intended to be stored and shared at a later time.

A flash 129 and a mirror 130 are disposed adjacent to the second image input unit 128. When an object is captured by the second image input unit 128, the flash 129 emits light toward the object. When a user wants to capture himself or herself by using the second image input unit 128, the mirror 130 serves to reflect the user's face.

A second audio output unit 131 is located at the rear case 122. The second audio output unit 131 may provide a stereo function in conjunction with the first audio output unit 114 (refer to FIG. 1), and may be used for calling in a speaker phone mode.

While various features of the portable terminal 100 have been described as being located on either the upper body 110 or lower body 120, it is possible for one or more of these features to be located in a different position. For example, at least one of the components 128 to 132 explained to be disposed at the rear case 122 may be mounted to the upper body 110, in particular, to the rear case 112. In this case, components disposed at the rear case 112 can be protected by the lower body 120 in a closed configuration. Furthermore, even when the second image input unit 128 is not provided, the first image input unit 115 may be configured to be rotatable so that it can capture not only objects in its capturing direction, but also capturing objects in a direction that would otherwise be covered by the second image input unit 128.

Figure 3:
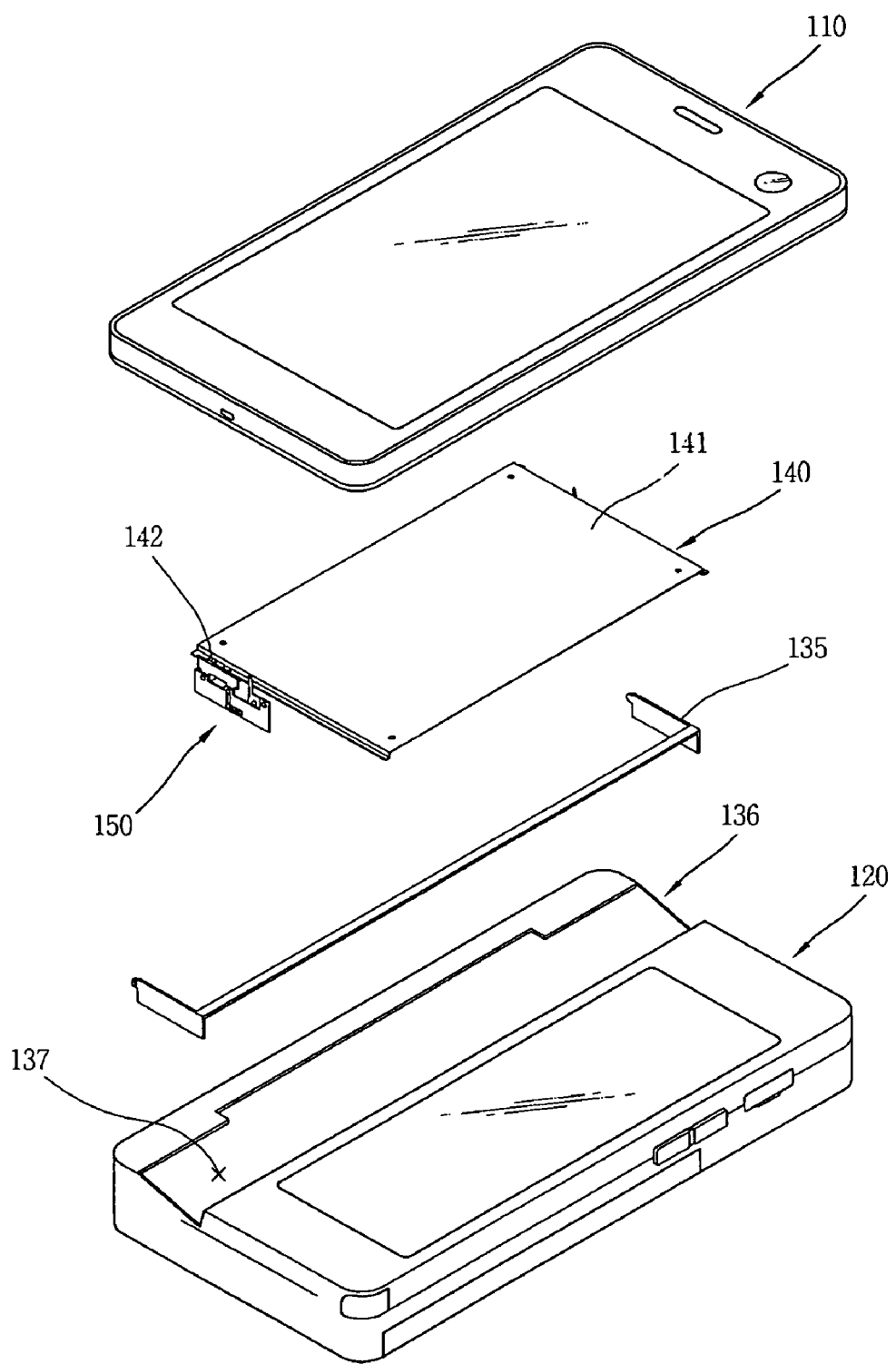
FIG. 3 is an exploded perspective view of the portable terminal of FIGS. 1A and 1B.
Figure 4:
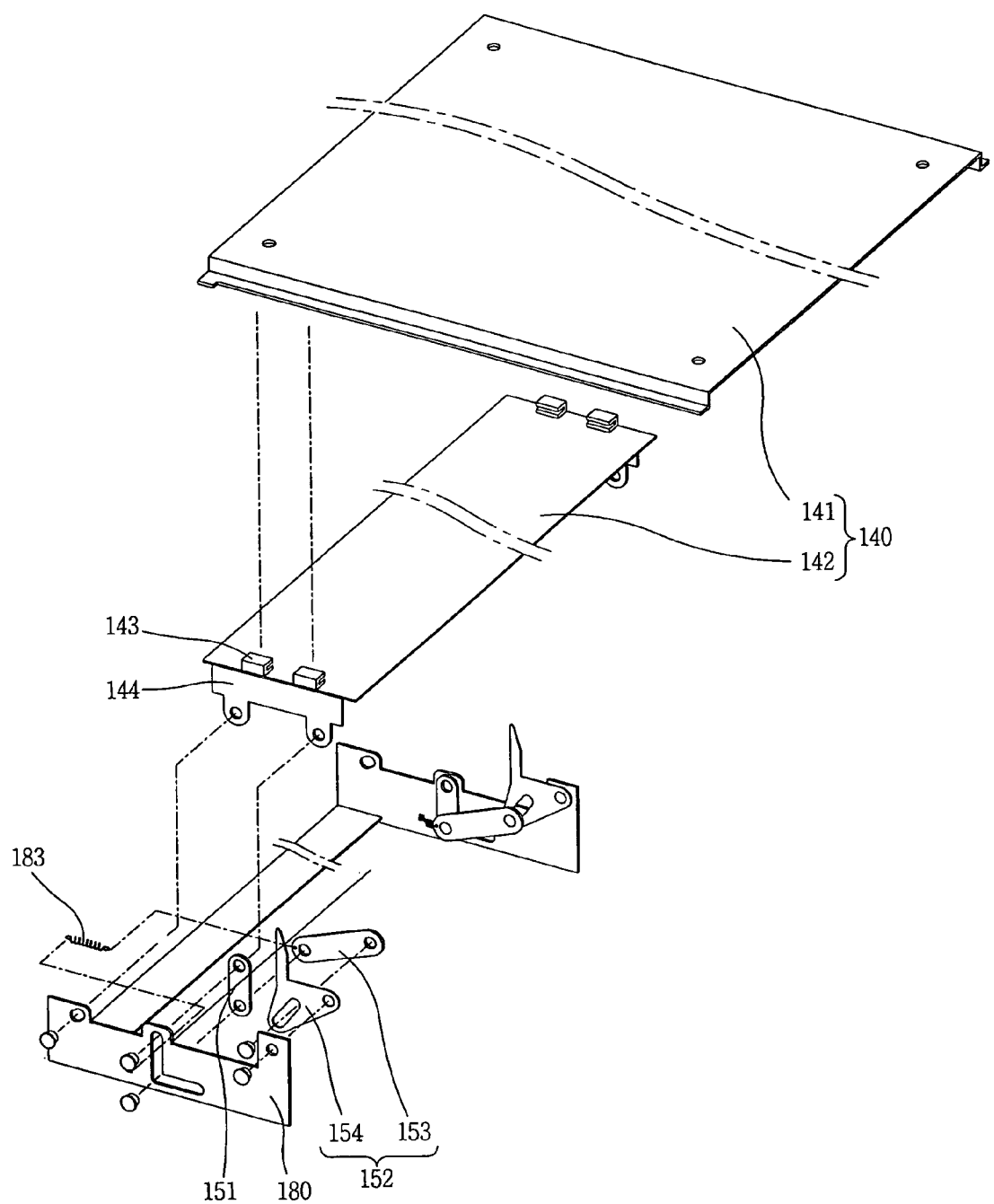
FIG. 4 is an exploded perspective view of a slide module and a first moving unit of FIG. 3.

FIG. 3 is an exploded perspective view of the portable terminal of FIGS. 1A and 1B, and FIG. 4 is an exploded perspective view of a slide module and a first moving unit of FIG. 3. As shown in FIG. 3, the portable terminal 100 includes a slide module 140 configured to slidably couple the upper body 110 to the lower body 120, and a first moving unit 150 between the upper body 110 and the lower body 120. The first moving unit 150 is configured to move a part of the upper body 110 in an up and down direction when the upper body 110 is moved between the closed position and the open position.

The slide module 140 includes an upper slide member 141, a lower slide member 142 slidably coupled to the upper slide member 141, and a slide groove 143 connecting the upper slide member 141 to the lower slide member 142. As shown in FIG. 3, the upper slide member 141 may have a plate shape and is fixed to the upper body 110. The upper slide member 141 is inserted into the slide grooves 143, which are located at a side surface of the lower slide member 142. An elastic force supply unit (not shown) connected between the upper slide member 141 and the lower slide member 142 to provide an elastic force to the upper and lower slide members 141 and 142 when the upper and lower slide members 141 and 142 are slid with respect to each other. The elastic force supply unit may be implemented by using an elastic force that occurs when a spring is compressed and restored. For instance, the elastic force supply unit may include a spring that generates an elastic force when compressed and is restored by passing through a dead point as the upper and lower slide members 141 and 142 move with respect to each other in a predetermined region.

The first moving unit 150 is configured to move one part of the upper body 110 with respect to the lower body 120 in an up and down direction when the upper body 110 is moved between a closed and an open position. The first moving unit 150 is connected to a lower part of the slide module 140. The first moving unit 150 is configured to cause one part of the slide module 140 to be moved in an up and down direction. As the one part of the slide module 140 is moved in an up and down direction, one part of the upper body is also moved in an up and down direction. A second moving unit similar to the first moving unit may be provided at an end of the portable terminal opposite the first moving unit 150. Because the second moving unit is similar to the first moving unit, the following description will be with reference to the first moving unit.

The first moving unit 150 is provided with a tilting portion 160 (refer to FIG. 5A) configured to erect the upper body 110 with respect to the lower body 120 at a predetermined angle. The upper body 110 is configured to be erected with respect to the lower body 120 at a predetermined angle as one side thereof is lowered about a point at a constant height, as will be described in detail below.

The lower body 120 includes a recess portion 136 serving as a lowering space for the upper body 110. The recess portion 136 may be formed as a depression with respect to an upper surface of the lower body 120. A mounting recess 137 for partially mounting the first moving unit 150 is formed on the recess portion 136. An inclination surface may be formed at the lower body 120 in correspondence with an erection angle of the upper body 110. Details of the first moving unit will be described below with reference to FIGS. 3, 4, and 5A to 5D.

The first moving unit 150 includes a link member 151 connected to the lower slide member 142, and a linkage operator 152 configured to operate the link member 151. The link member 151 is connected to the slide module 140, more particularly, to the lower slide member 142 via a wing portion 144 configured formed at the lower slide member 142. The wing portion 144 may extend from a side surface of the lower slide member 142 toward the first moving unit 150. One end of the link member 151 is connected to the wing portion 144 at a first connecting point 161.

The linkage operator 152 is provide to cause the first connecting point 161 to be moved in a direction perpendicular to a slide direction when the upper body 110 is moved between a closed position and an open position. That is, the linkage operator 152 serves to move the first connecting point 161 up and down along a vertical path. The linkage operator 152 includes a first operation member 153 connected to the link member 151, and a second operation member 154 configured to operate the first operation member 153 when the upper body 110 is slid with respect to the lower body 120.

The first operation member 153 is pivotally connected to the link member 151, thereby allowing the link member 151 to rotate. In particular, the link member 151 is connected to the first operation member 153 by a second connecting point 162. The first operation member 153 may be formed to have a bar shape having one curved region. The first and second connecting points 161 and 162 may be implemented as connection pins.

The second operation member 154 is pivotally connected to the first operation member 153, and is connected to the end of the first operation member 153 by a third connecting point 163. An operation protrusion 156 is extends at one side of the second operation member 154. A push protrusion 119 is provided at a lower surface of the upper body 110 to rotate the second operation member 154 by pushing the operation protrusion 156 when the upper body 110 performs a sliding motion.

The first moving unit 150 also includes a tilting portion 160 configured to erect the upper body 110 with respect to the lower body 120 at a predetermined angle. In particular, the tilting portion 160 includes a fixed connecting point 160aa configured to pivotally connect the wing portion 144 of the lower slide member 142 and the lower body 120. Also, the tilting portion 160 is configured to erect one end of the lower slide member 142 as the first connecting point 161 is lowered.

A support member in the form of a supporting frame 180 is configured to support the link member 151, the first operation member 153, second operation member 154, and the fixed connecting point 160a. The supporting frame 180 may be provided on the mounting recess 137 of the lower body 120. As shown in this exemplary embodiment the supporting frame 180 is a separate member; however, the supporting frame 180 may be integrally formed at the lower. In this exemplary embodiment where the supporting frame 180 is installed as a separate member, the fixed connecting point 160a may be disposed on the supporting frame 180, and pivotally connects the lower slide member 142 to the supporting frame 180. The supporting frame 180 includes a first slot portion 181 configured to guide a vertical motion of the first connecting point 161, and a second slot portion 182 extending from the first slot portion 181 toward one side. The second slot portion 182 serves to guide a motion of the second connecting point 162. As the first connecting point 161 vertically moves along the first slot portion 181, the second connecting point 162 moves along the second slot portion 182. That is, the second slot portion 182 serves to guide the second connecting point 162 to move toward an interior of the lower body 120. The second slot portion 182 may have a length direction perpendicular to a length direction of the first slot portion 181 or otherwise extend in a lateral direction of the portable terminal.

The second operation member 154 is located on the supporting frame 180 so as to be pivotable around a rotation shaft 164 and is configured so as to move the first operation member 153 when pivoted. A third slot portion 155 configured to guide a linear motion of the third connecting point 163 may be formed on the second operation member 154.

A spring 183 configured to supply a restoration force to lift up the upper body 110 may be installed between the supporting frame 180 and the first operation member 153. The spring 183 is mounted between one end of the first operation member 153 and the supporting frame 180. The spring 183 is configured so as to be tensed when the first operation member 153 moves toward the interior of the lower body 120. In this exemplary embodiment, the spring 183 has an elastic force that is smaller than that of the elastic force supply unit of the slide module 140.

As shown in FIG. 4, the link member 151, the first and second operation members 171 and 172, and the tilting portion 160 may be provide in duplicate at opposite sides of the portable terminal 100 via the supporting frame 180, and have the same configuration as described above.

As seen in FIGS. 1 to 3, a cover 135 for covering the first moving unit 150 in a closed configuration may be installed at an outer periphery of the recess portion 136. The cover 135 has a shape corresponding to an outer circumferential surface of the recess portion 136, and is mounted to a rear surface of the lower slide member 142 to move with the lower slide member 142. The cover 135 is configured to be inserted into the lower body 120 when the upper body 110 is lowered, and is configured to cover the first moving unit 150 by being exposed when the upper body 110 is lifted.

Because of the arrangement of the first moving unit 150, the upper body 110 is slidably connected to the lower body 120 for movement between a closed position and an open position to expose a portion of the upper surface of the lower body, and the first moving unit 150 is connected between the upper body and the lower body to move at least a portion of the upper body 110 in a second direction different from the first direction. The first moving unit 150 is configured to move the portion of the upper body 110 toward the lower body 120 along the second direction when the upper body 110 is moved from the closed position to the open position and to move the portion of the upper body 110 away from the lower body 120 along the second direction when the upper body 120 is moved from the open position to the closed position. The first moving unit 150 includes a support member 180, the upper body 110 being pivotally connected to the support member 180, and the linkage operator 152 is connected to the upper body 110 to pivot the upper body 110 with respect to the lower body 120 when the upper body 120 moves between the closed position and the open position. The sequential operation of the first moving unit 150 will be described in greater detail below with reference to FIGS. 5A to 5D.

Figure 5A:
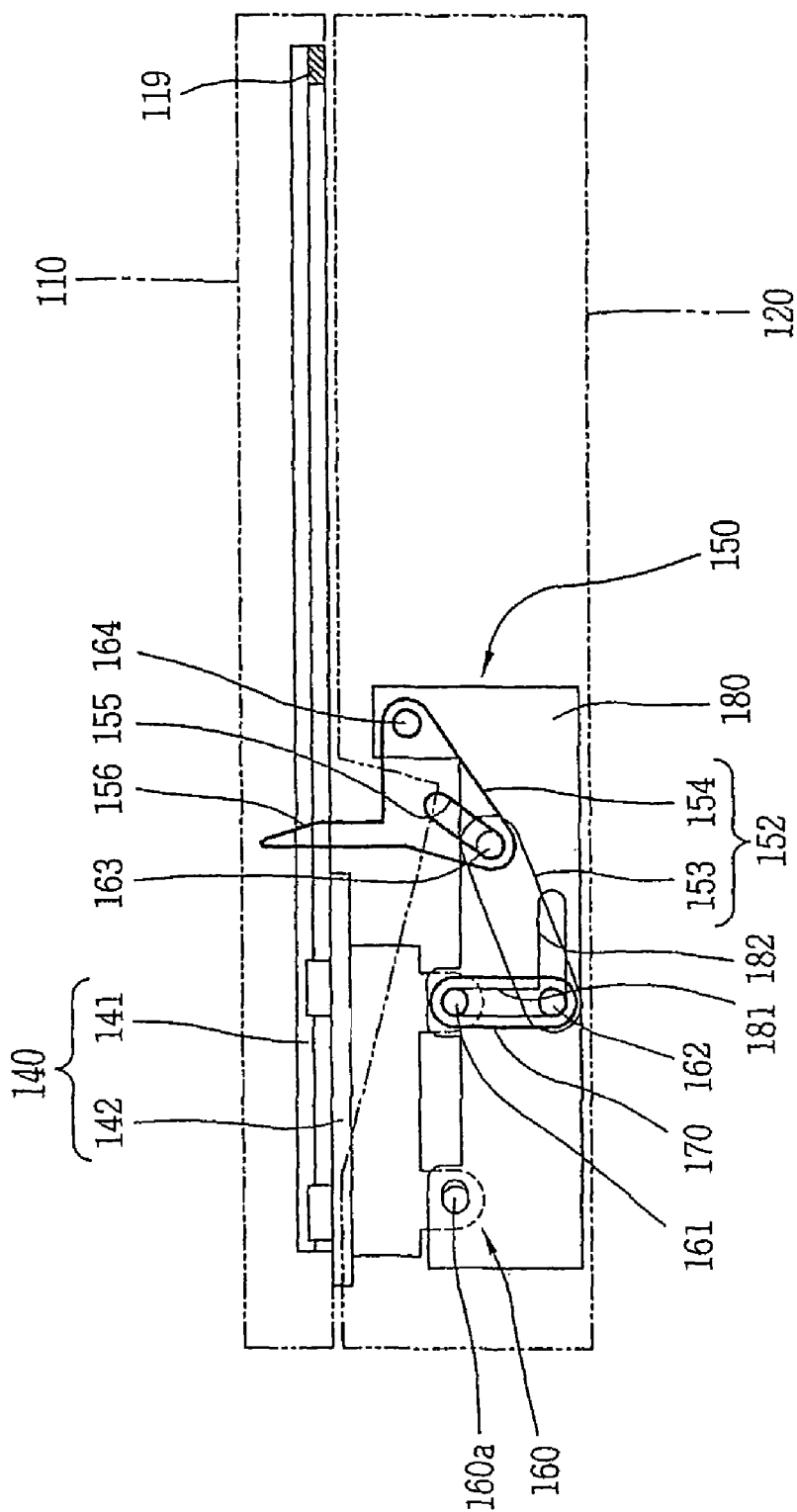
FIGS. 5A to 5D are sectional views of the portable terminal, which show a structure and operation of the first moving unit.

FIG. 5A shows the portable terminal 100 in a closed configuration. In the state shown in FIG. 5A, when a user applies a force to the upper body 110 or the lower body 120, the upper and lower bodies 110 and 120 move relative to each other. Here, the upper slide member 141 performs a sliding motion on the lower slide member 142. Under this state, once the user moves the upper body 110 to a dead point of the elastic force supply unit, the upper body 110 automatically moves toward the open position by an elastic force of the elastic force supply unit.

Figure 5B:
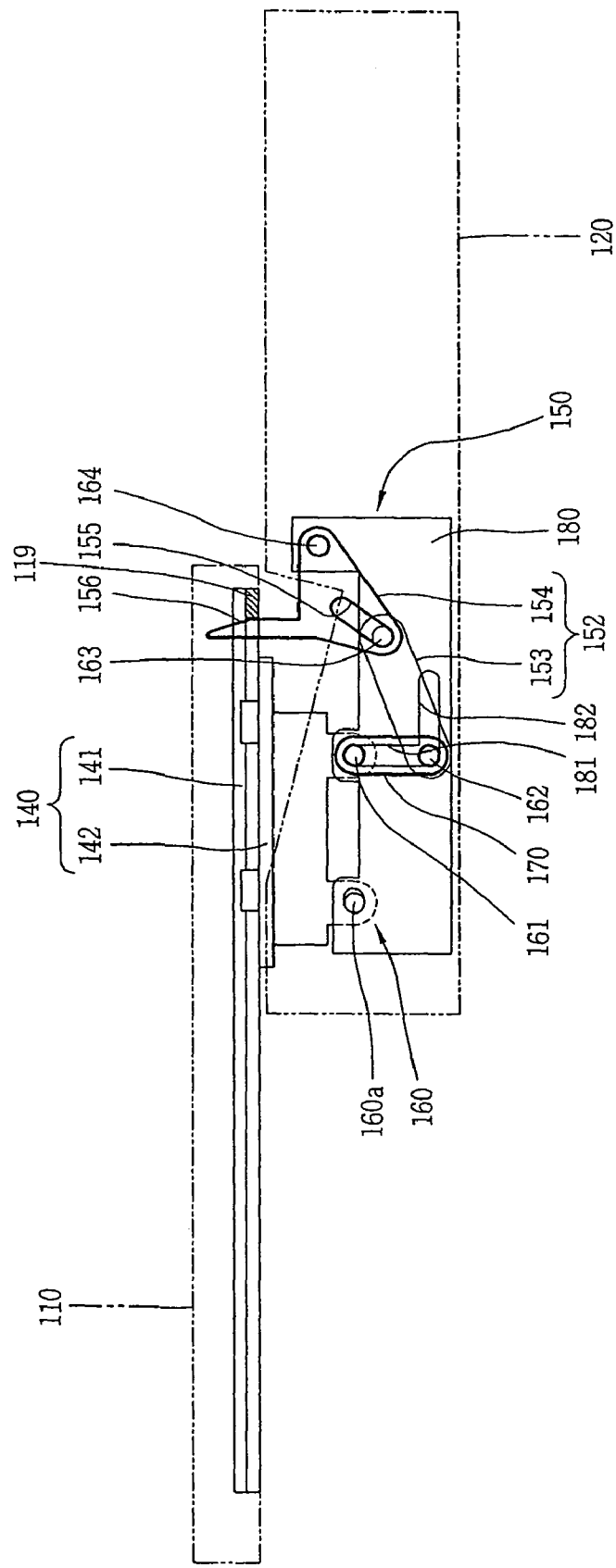

As shown in FIG. 5B, once the push protrusion 119 of the upper body 110 reaches the recess portion 136 of the lower body 120, the push protrusion 119 pushes the operation protrusion 156 of the second operation member 154, thereby applying a pivoting force to the second operation member 154.

Figure 5C:
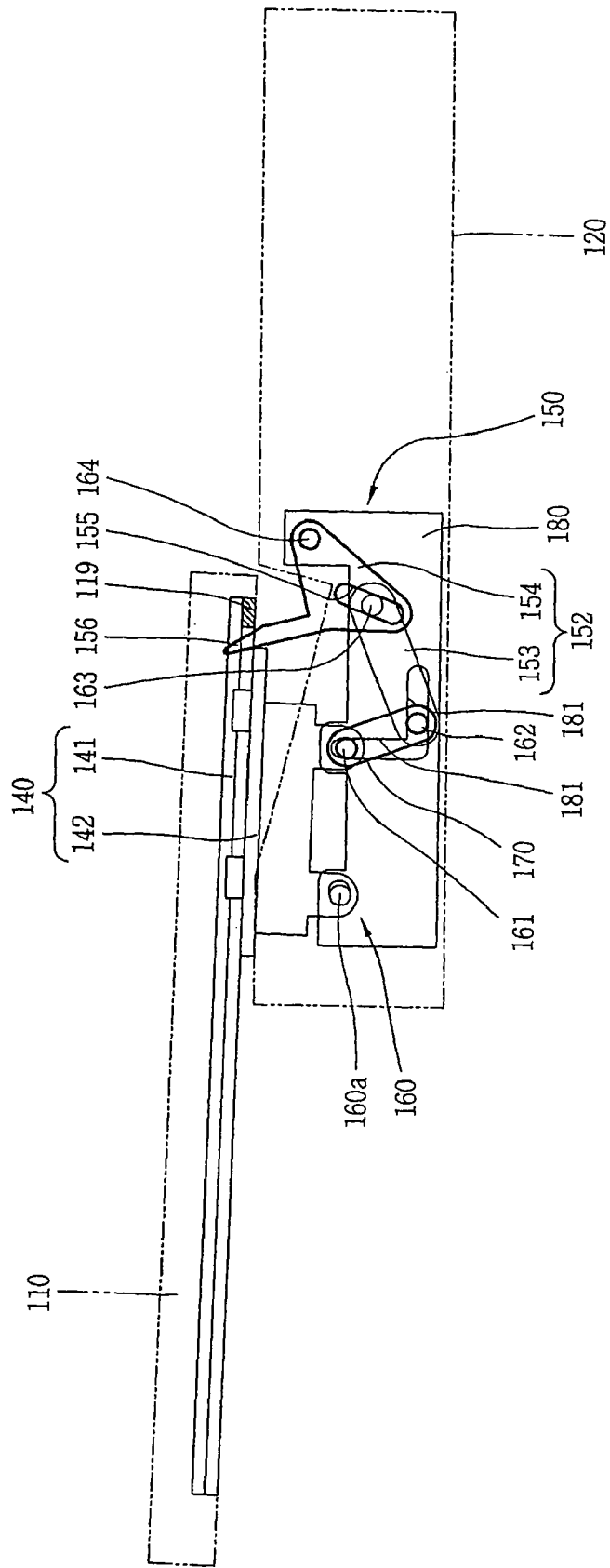

As shown in FIG. 5C, as the second operation member 154 is pivoted, the first operation member 153 is linearly moved toward the interior of the lower body 120. Under this state, the first operation member 153 pivots the link member 160, thereby causing the first to third connecting points 161, 162, and 163 to move linearly on the first to third slot portions 181, 182, and 155, respectively.

Figure 5D:
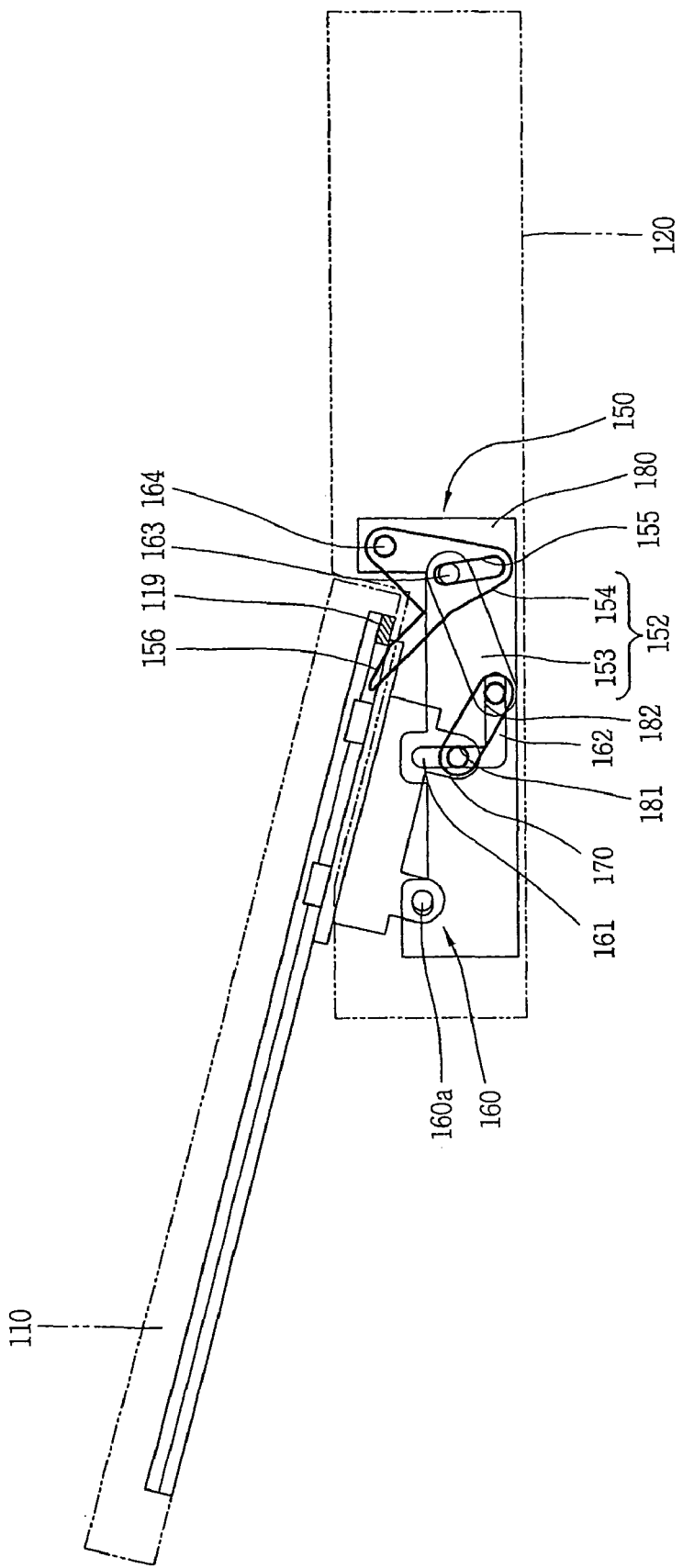

As the first connecting point 161 is lowered in a vertical direction, the lower slide member 142 pivots around the fixed connecting point 160a. Here, the fixed connecting point 160a is maintained at the original height, thereby inclining the lower slide member 142 and the upper body 110 in one direction. FIG. 5D shows a state that a part of the upper body 110 is completely lowered by pivoting about the link member 160. Accordingly, the upper body 110 is erected with respect to the lower body 120 at a predetermined angle. In this exemplary embodiment, because the elastic force from the elastic force supply unit is greater than the elastic spring force of the spring 183, the part of the upper body 110 that is lowered can be maintained in this position.

To move the upper body 110 from the open position, as shown in FIG. 5D, the process is repeated in reverse order. In particular, a user applies a force to the upper body 110 in an upward direction, thereby causing the lowered part of the upper body 110 to be lifted. In this manner, the spring 183 provides a restoration force to lift up the upper body 110. When the user applies a force to the upper body 110 toward a closed position after the upper body 110 is completely lifted, the upper and lower bodies 110 and 120 perform a relative sliding motion into the closed configuration.

Figure 6:
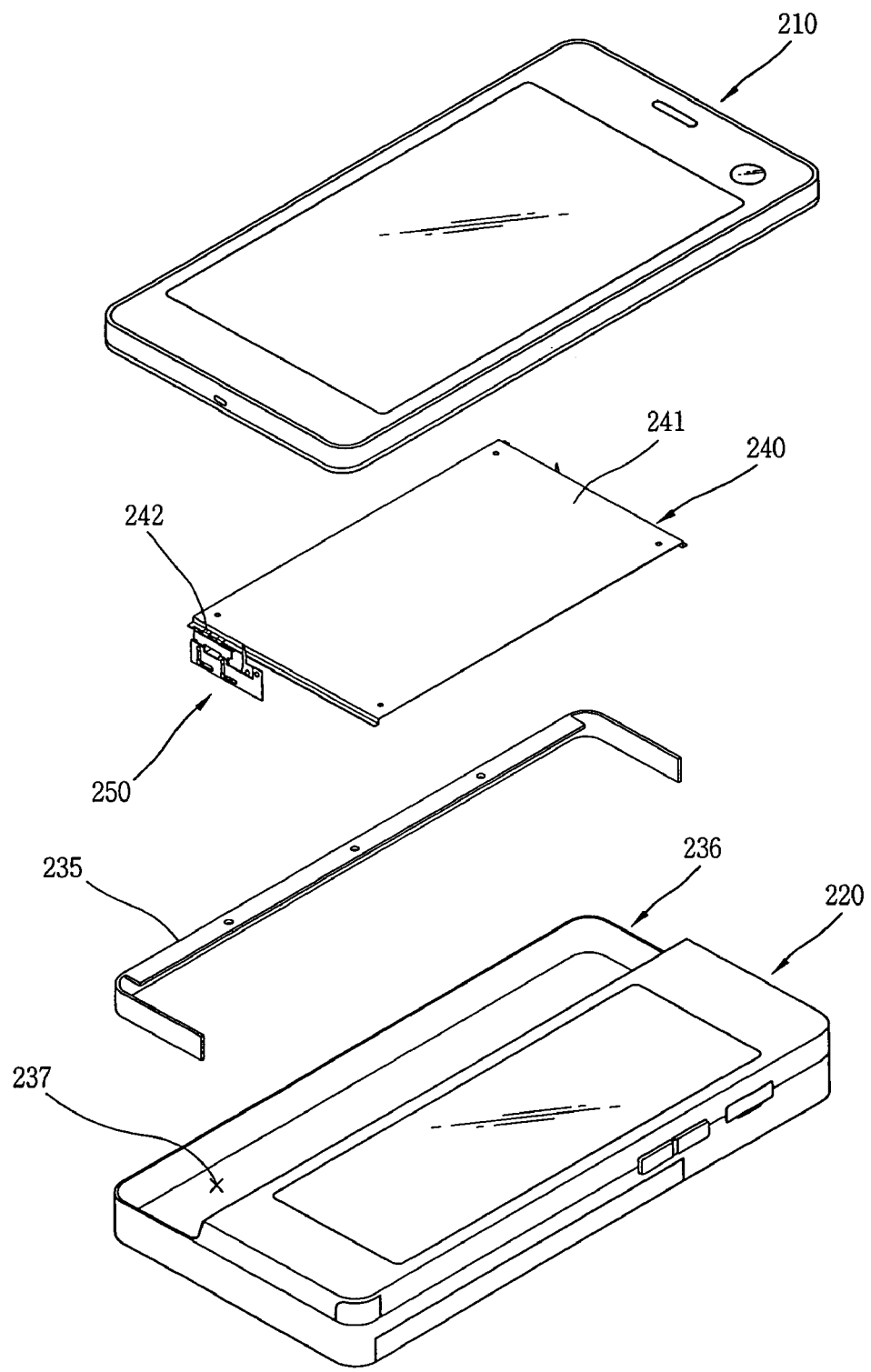
FIG. 6 is an exploded perspective view of a portable terminal according to a second exemplary embodiment of the present invention.
Figure 7:
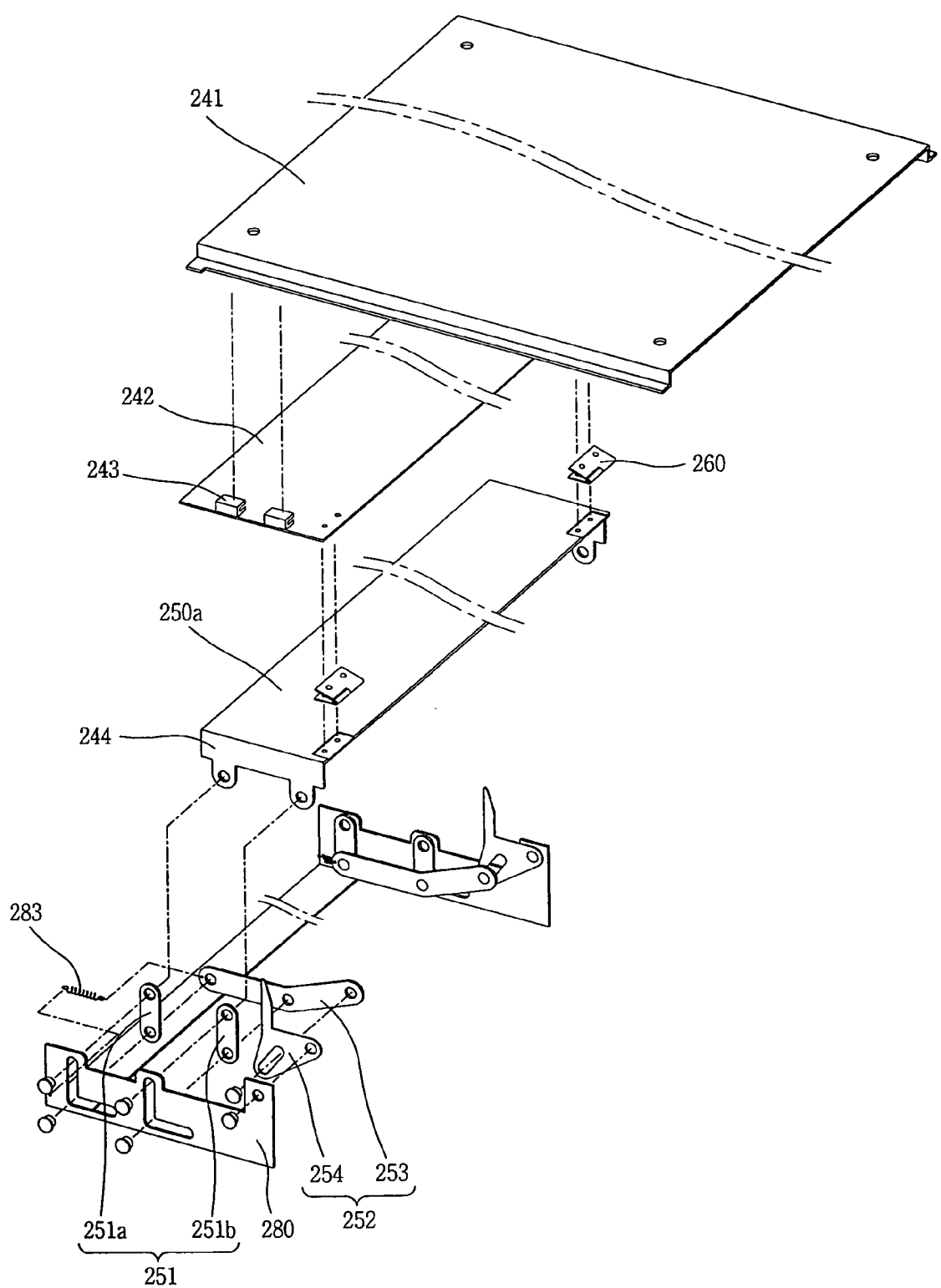
FIG. 7 is an exploded perspective view of a slide module and an first moving unit of FIG. 6.

FIG. 6 is an exploded perspective view of a portable terminal according to a second embodiment of the present invention, FIG. 7 is an exploded perspective view of a slide module and an first moving unit of FIG. 6, and FIGS. 8A to 8C are sectional views of the portable terminal of FIG. 6. Similar reference numerals were given to configurations similar to those of the aforementioned preferred embodiment.

Referring to FIGS. 6 and 7, the first moving unit 250 according to a second exemplary embodiment includes a base 250a connected to the lower slide member 242, a link member 251 connected to the base 250a via the wing portion 244, and a linkage operator 252 connected to the link member 251. The first moving unit 250 is configured to vertically move a first connection point 261 between the base 250a and the link member 251 in an up and down motion.

The first moving unit 250 includes a tilting portion 260 configured to erect the upper body 210 with respect to the lower body 220 at a predetermined angle. The tilting portion 260 may include a tilting hinge 260 configured to rotatably connect the lower slide member 242 and the base 250a to each other so that the lower slide member 242 can be erected with respect to the base 250a.

The link member 251 may include first and second link members 251a and 251b connected between the wing portion 244 and the base 250a. The linkage operator 252 includes a first operation member 253 connected to the first and second link members 251a and 251b, and is configured to provide a pivoting force to the first and second link members 251a and 251b. The linkage operator 252 includes a second operation member 254 connected to the first operation member 253 and operates the first operation member 253.

The link member 251, the first operation member 253, and the second operation member 254 have the same configurations as those of the aforementioned first exemplary embodiment, and thus their detailed explanation will be omitted.

A cover 235 for covering components of the first moving unit 250 in a closed configuration may be located at an outer periphery of a recess portion 236. The cover 235 is formed to have a shape corresponding to an outer circumferential surface of the recess portion 236, and is mounted to a rear surface of the base 250a thus to integrally move with the base 250a. The cover 235 is configured to be inserted into the lower body 220 when the upper body 210 is lowered, and is configured to cover the first moving unit 250 when the upper body 210 is lifted. The sequential operation of the first moving unit 250 will be described in greater detail below with reference to FIGS. 8A to 8D.

Figure 8A:
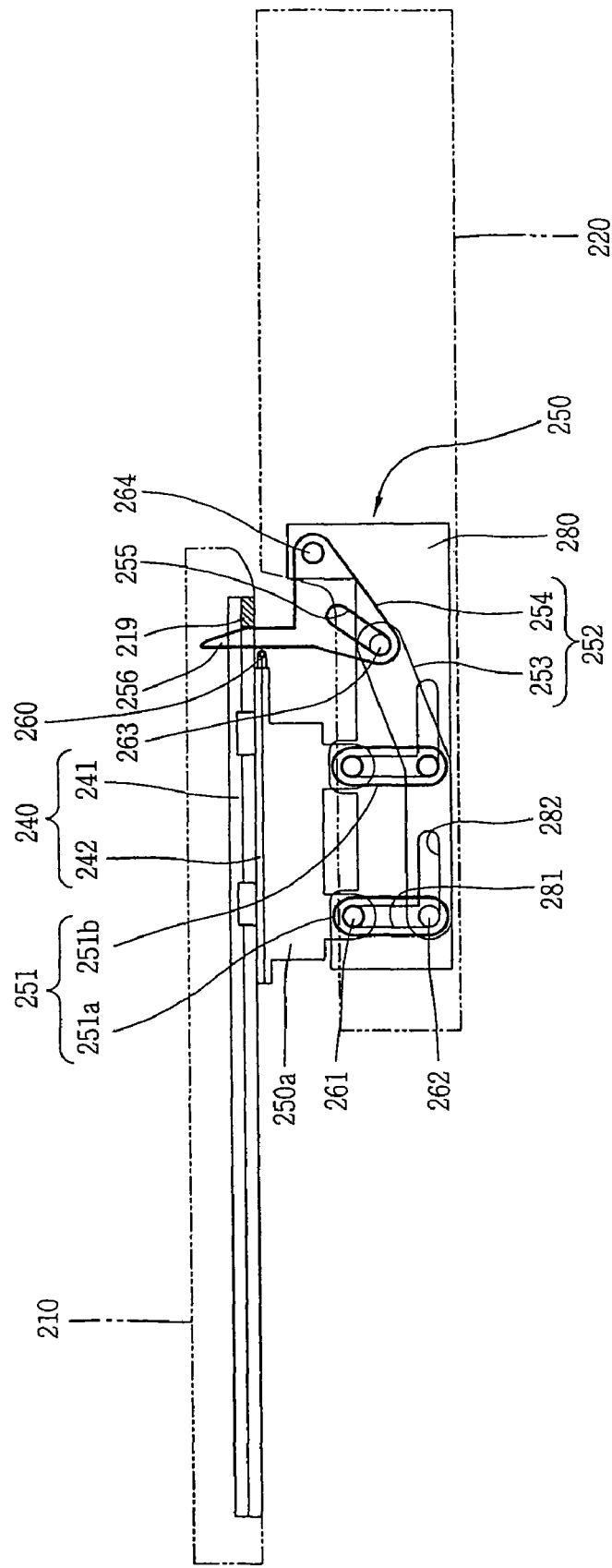
FIGS. 8A to 8D are sectional views of the portable terminal of FIG. 6, which show a structure and operation of the first moving unit in accordance with the second exemplary embodiment.

As shown in FIG. 8A, the push protrusion 219 of the upper body 210 pushes an operation protrusion 256 of the second operation member 254 as the upper slide member 241 performs a sliding motion. This process is similar to that described with reference to the firs exemplary embodiment.

Figure 8B:
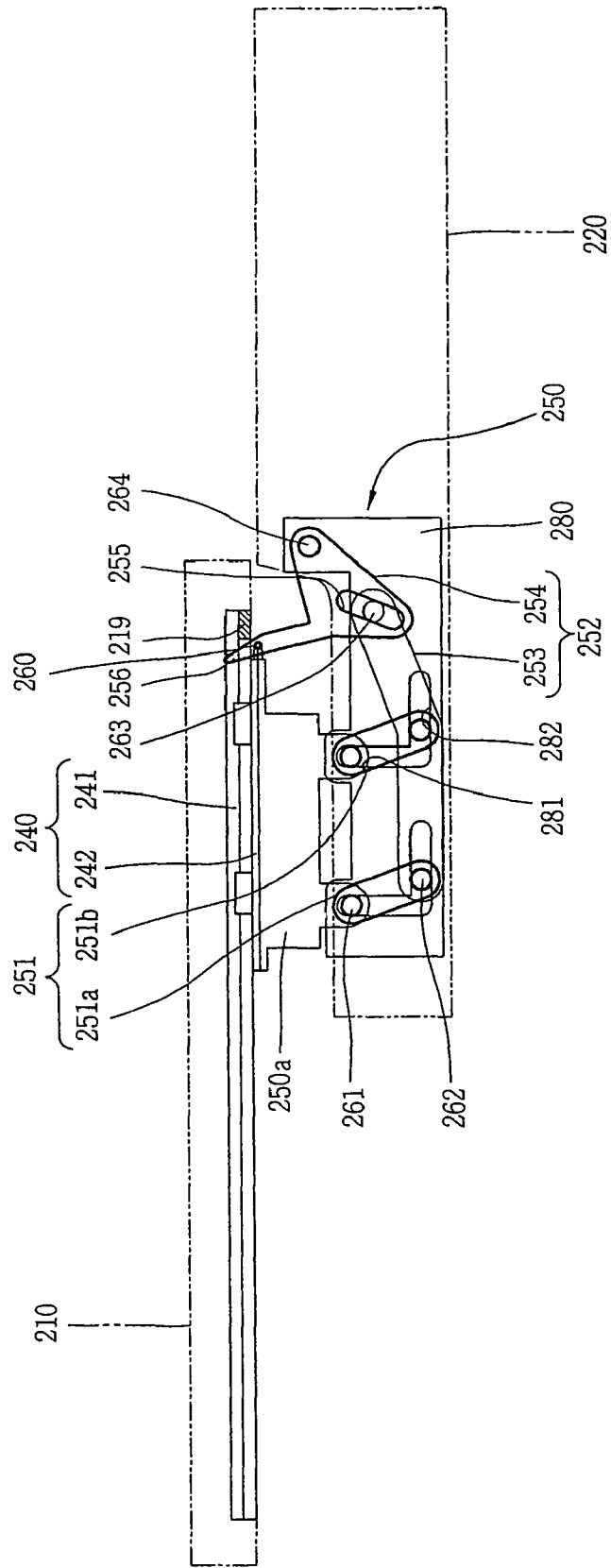
Figure 8C:
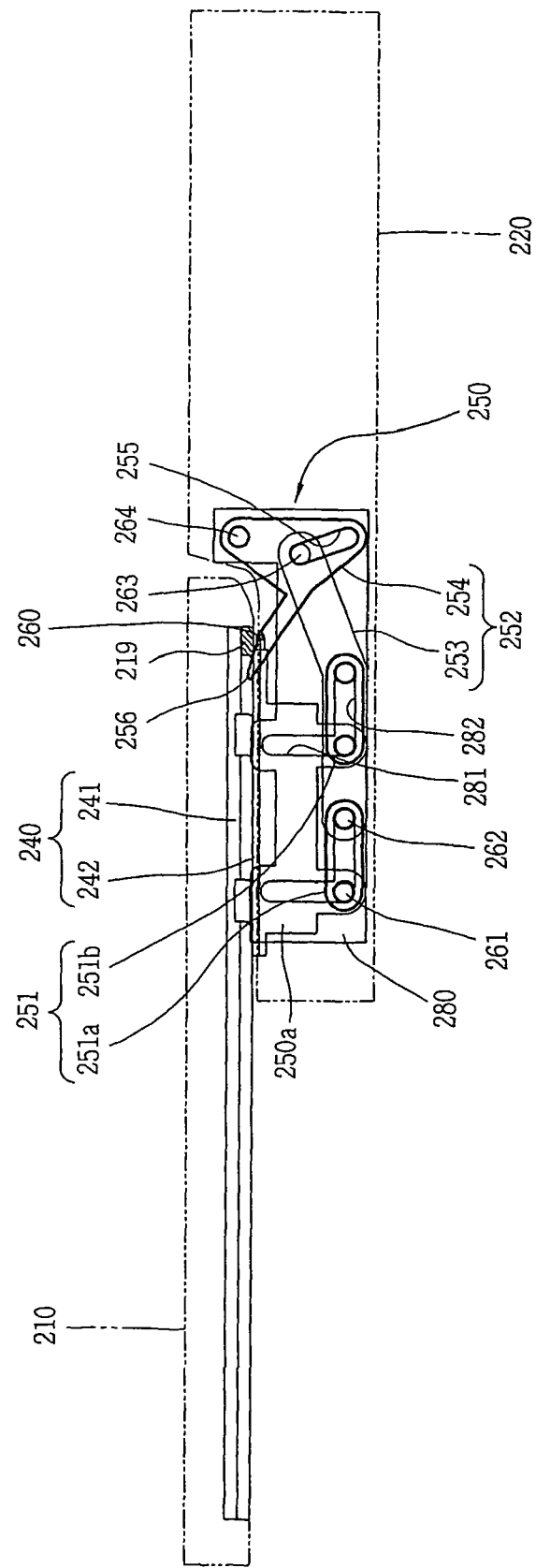

As shown in FIG. 8B, as the second operation member 254 is pivoted, the first operation member 253 is linearly moved toward the interior of the lower body 222, thereby causing the first and second link members 251a and 251b to be pivoted. The first connecting point 261 is vertically lowered. Accordingly, the base 250a is vertically lowered, and the upper body 210 is lowered while maintaining a horizontal state. In this exemplary embodiment, the link member 251, the first operation member 253, and the second operation member 254 have the same operation as that of the first exemplary embodiment, and thus their detailed explanation will be omitted.

Figure 8D:
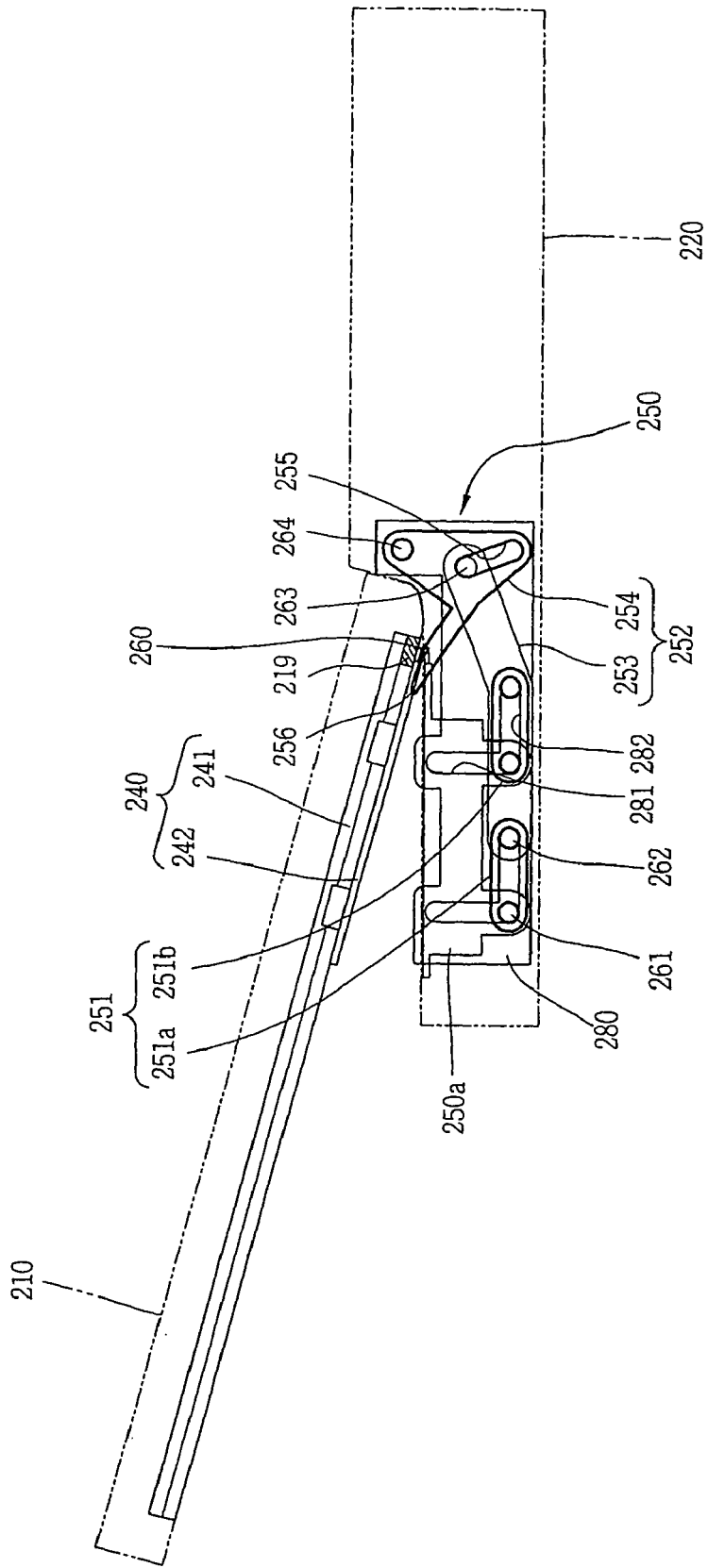

When a user applies a force to one end of the upper body 210 in an upward direction, the lower slide member 242 is pivoted around the tilting hinge 260. In this manner, the lower slide member 242 performs a relative rotation with respect to the base 250a. As shown in FIG. 8D, the upper body 210 is erected with respect to the lower body 220 at a certain angle.

To move the upper body 210 back to the closed position, the process is reversed.

Figure 9A:
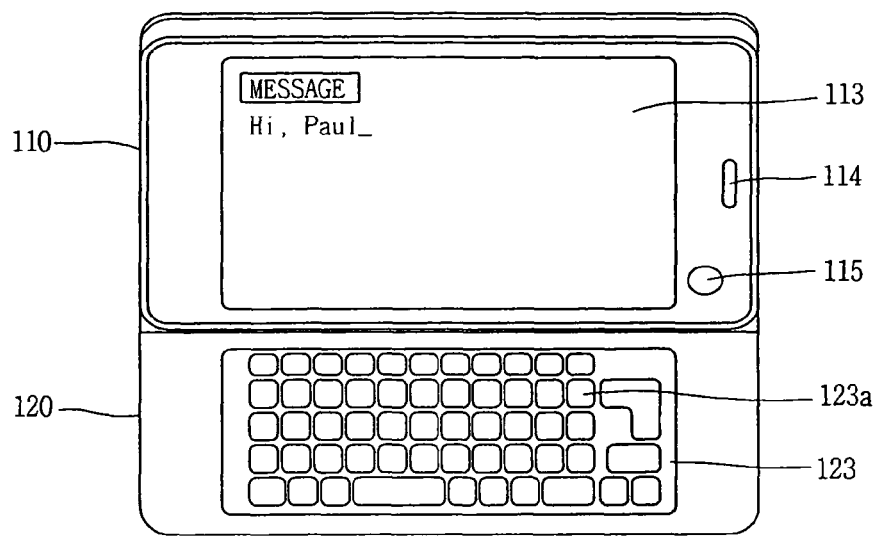
FIGS. 9A and 9B are plan views of the portable terminal, which shows an operation state.
Figure 9B:
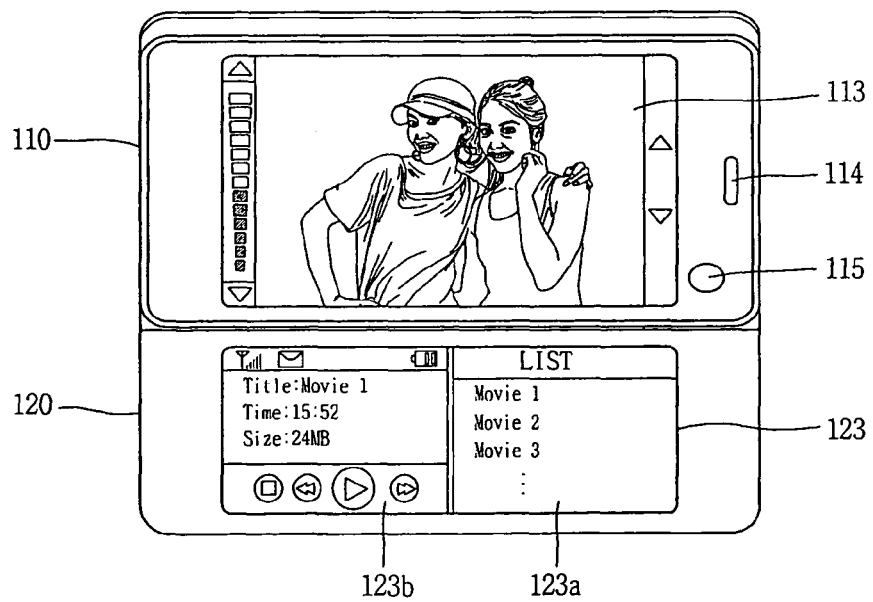

FIGS. 9A and 9B are plan views of the portable terminal according to the first exemplary embodiment, which show various operation states of the portable terminal. It is understood that these operation states can be used by the portable terminal according to the second exemplary embodiment. In a closed configuration, the portable terminal may be used in a similar manner to a bar type portable terminal. For instance, when the first display 113 is implemented as a touch screen, telephone numbers, text messages, and so on may be inputted through the first display unit 113, and a call, or transmission or reception of text messages, and so on may be performed.

When the portable terminal is converted to an open configuration from a closed configuration, additional functions (e.g., multimedia functions) may be operated. To this end, the second display unit 123 is activated to assist with the use of the additional function. For example, as shown in FIG. 9A, the portable terminal can be used in the open position to assist in typing messages using the second display unit 123. The second display unit 123 can be a touch screen that displays a QWERTY type of keyboard 123a. When a user touches the keyboard 123a, corresponding information is output to the first display unit 113 in the form of text.

As shown in FIG. 9B, the first display unit 113 and the second display units 123 may be configured to display visual information that can be useable with each other by a user's touch. For example, the first display unit 113 may display at least one of content of music, broadcasting, and moving images. On the second display unit 123, icons to control reproduction of the music, broadcasting, and moving images may be displayed. In this exemplary embodiment, the second display unit 123 may be implemented as a touch screen, and users can control reproduction of music, broadcasting, and moving images by touching the icons. In addition, the second display unit 123 may display various visual information, such as detailed information of a file reproduced from the first display unit 113, and a list of files stored in the portable terminal.

Figure 10:
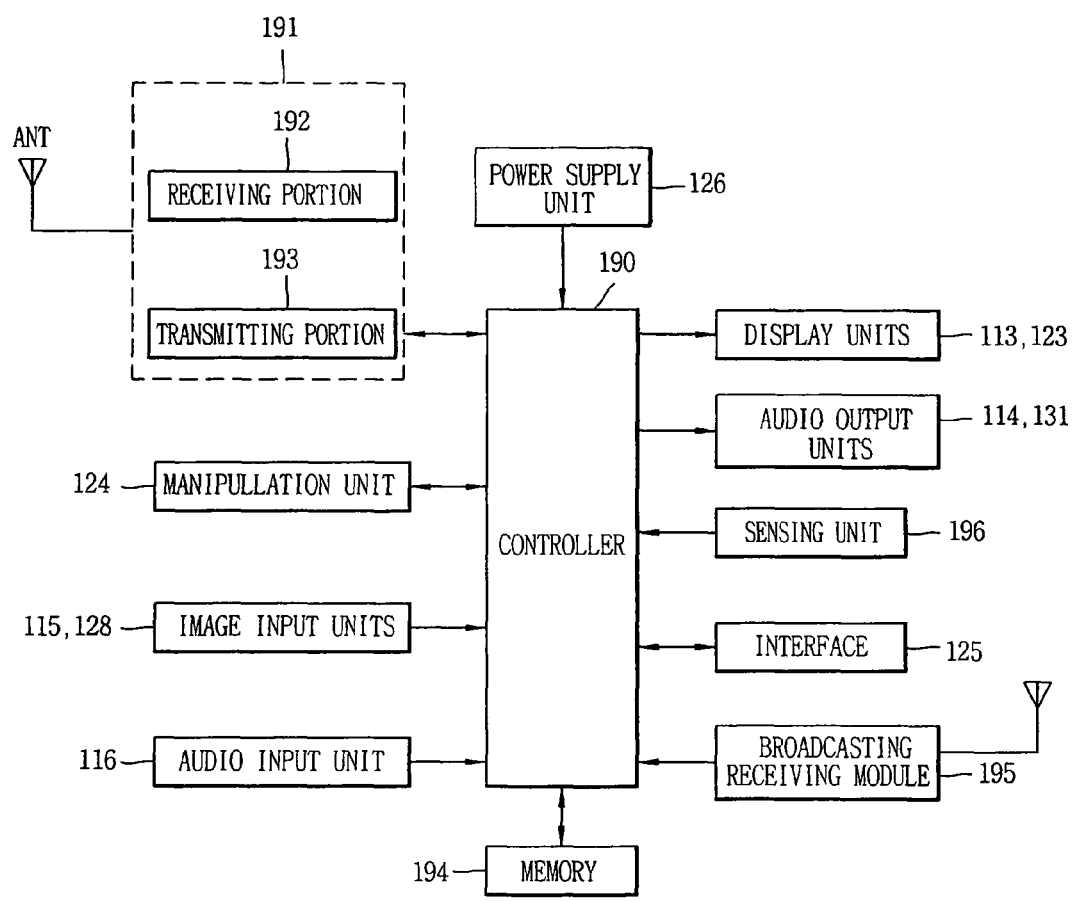
FIG. 10 is a block diagram of the portable terminal according to a first embodiment of the present invention.

FIG. 10 is a block diagram of the portable terminal according to the present invention. As seen in FIG. 10, the portable terminal 100 according to the first exemplary embodiment of the present invention includes a wireless communication module 191, a manipulation unit 124, image input units 115 and 128, an audio input unit 116, display units 113 and 123, audio output units 114 and 131, a sensing unit 196, an interface 125, a broadcasting receiving module 195, a memory 194, a power supply unit 126, and a controller 190. The controller 190 controls the entire operation of the portable terminal. For instance, the controller 190 performs control and processing relating to a voice call, data communication, a video call, and so on.

The wireless communication module 191 transmits or receives wireless signals to/from a base station through an antenna. For instance, the wireless communication module 191 includes a transmitting portion 193 configured to perform transmission of voice data, text data, image data, and control data under control of the controller 190, and to transmit signals after a modulation process. The wireless communication module 191 also includes a receiving portion 192 configured to demodulate received signals.

The manipulation unit 124 may have a configuration as shown in FIGS. 1A and 1B, and provides key input data inputted to the controller 190 to control operation of the portable terminal. The manipulation unit 124 may be formed as a dome switch, a touch screen or touchpad (static pressure/static electricity), a jog wheel, a jog switch, a joystick and the like.

The image input units 115 and 128 process image frames such as still images or moving images obtained by an image sensor in an image call mode or a capturing mode. Then, the processed image frames are converted to image data that can be displayed on the display units 113 and 123 to be output to the display units 113 and 123. The image frames processed by the image input units 115 and 128 are stored in the memory 194, or are outwardly transmitted through the wireless communication module 191 under control of the controller 190.

The audio input unit 116 receives external audio signals by a microphone in a call mode, or a record mode, a voice recognition mode, and the like, and processes the signals into electric audio data. In the case of a call mode, the processed audio data is converted into data that can be transmitted to a base station through the wireless communication module 191, and thus is output to the wireless communication module 191. In the case of a record mode, the processed audio data is output to be stored in the memory 194. The audio input unit 116 may implement various algorithms to remove noise occurring when external audio signals are received.

The display units 113 and 123 display to output information processed in the portable terminal. For instance, in the case of a call mode, the display units 113 and 123 display a User Interface (UI) or a Graphic User Interface (GUI) relating to a call under control of the controller 190. In the case of a video call mode or a capturing mode, the display units 113 and 123 display output captured images, UI, or GUI under control of the controller 190. When the display unit 113 includes a touch screen, the display unit 113 may be used as an input device as well as an output device.

The audio output units 114 and 131 convert audio data received from the wireless communication module 191 in a call mode, a record mode, a voice recognition mode, a broadcasting reception mode, and the like, or convert audio data stored in the memory 194, under control of the controller 190, thereby outputting the converted data external to the portable terminal 100. The audio output units 114 and 131 may also output audio signals relating to functions performed in the portable terminal (e.g., a call signal receiving sound, a message receiving sound, etc.). The audio output units 114 and 131 may include a speaker, a receiver, a buzzer, and the like.

The sensing unit 196 senses the current state of the portable terminal such as an open/close state, a position of the portable terminal, or whether or not a user's is contacting the manipulation unit 124, thereby generating sensing signals to control operation of the portable terminal. Furthermore, the sensing unit 196 senses whether power was supplied from the power supply unit 126, whether the interface 125 was coupled to external devices, and the like.

The interface 125 allows interfacing with external devices connected to the portable terminal, such as a wire/wireless headset, an external charger, a wire/wireless data port, and a card socket (e.g., memory card, SIM/UIM, etc.). The interface 125 receives data or power from external devices thus to transmit to each component inside the portable terminal, or transmits data inside the portable terminal to the connected external devices.

The memory 194 may store programs for processing the controller 190, or may temporarily store input/output data (e.g., phonebook, messages, still images, moving images, and the like). The memory 194 may store programs for controlling operation of the controller 190 according to the present invention. The memory 194 may include a general hard disc, a card type memory (e.g., SD memory, or XD memory, etc.), a flash memory, RAM, ROM, and the like.

The broadcasting receiving module 195 receives broadcasting signals transmitted through satellite waves or terrestrial waves, and converts the broadcasting signals into broadcasting data that can be output to the audio output units 114 and 131, and the display units 113 and 123. Then, the broadcasting receiving module 195 outputs the converted data to the controller 190. The broadcasting receiving module 195 may receive additional data relating to broadcasting (e.g., Electric Program Guide (EPG), channel list, and the like). Broadcasting data and additional data converted by the broadcasting receiving module 195 may be stored in the memory 194.

The power supply unit 126 receives external power or internal power under control of the controller 190, thereby supplying a necessary amount of power to each component.

In the slide type portable terminal according to the present invention, the upper body has a structure to be up-down movable with respect to the lower body, and to be erected with respect to the lower body in an open configuration.

According to the exemplary embodiments of the present invention, the upper body is configured to move up and down with respect to the lower body in a simple manner. In addition, the upper body is pivotable with respect to the lower body. As a result, a more convenient user interface can be provided.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal comprising:
an upper body having an upper surface and a lower surface;
a lower body having an upper surface, the upper body being slidably connected to the lower body for movement between a closed position and an open position to expose a portion of the upper surface of the lower body;
a first moving unit connected between the upper body and the lower body, the first moving unit being configured to permit tilting of the upper body with respect to the lower body, the first moving unit including:
a link member connected to the lower slide member at a first connecting point, the first connecting point being configured to rotatably connect one end of the link member to the upper body; and
a linkage operator connected to the link member, the linkage operator being configured to move the first connecting point up and down; and
a support member configured to support the link member and the linkage operator, the support member including a first slot portion configured to guide a vertical motion of the first connecting point,
wherein an end of the link member opposite the end connected to the first connecting point is connected to the linkage operator by a second connecting point, and
wherein the support member includes a second slot portion extending from the first slot portion toward an interior of the lower body, the second slot portion being configured to guide a motion of the second connecting point.

2. The portable terminal of claim 1, further comprising:
a first display located at the upper body; and
a second display located at the lower body,
wherein at least one of the first and second displays is a touch screen for inputting information in a touch manner.

3. The portable terminal of claim 1, further comprising:
a slide module configured to connect the upper and lower bodies to each other in a slidable manner, the slide module including:
an upper slide member connected to the upper body; and
a lower slide member slidably connected to the upper slide member, the lower slide member being connected to the first moving unit.

4. The portable terminal of claim 3, wherein the first moving unit includes a tilting portion configured to erect the upper body with respect to the lower body at a predetermined angle in the open position, the tilting portion being connected to the lower support member at a fixed connecting point, such that the lower slide member is pivotable about the fixed connecting point so that one end of the lower slide member is erected as the first connecting point is lowered.

5. The portable terminal of claim 3, wherein the linkage operator includes:
   a first operation member connected to the link member, the first operation member being configured to move the first connecting point up and down by pivoting the link member; and
   a second operation member pivotally connected to the first operation member, the second operation member being configured to operate the first operation member to move the first operation member during the sliding motion of the upper body.

6. The portable terminal of claim 5, wherein the upper body includes a push protrusion configured to rotate the second operation member by pushing the second operation member during the sliding motion of the upper body.

7. The portable terminal of claim 5, wherein the fixed connecting point is located on the support member, the fixed connecting point connecting the lower slide member to the support member.

8. The portable terminal of claim 5, wherein the second slot portion extends in a lateral direction of the lower body.

9. The portable terminal of claim 5, wherein the first slot portion extends perpendicular to the second slot portion.

10. The portable terminal of claim 5, wherein the second operation member is pivotally mounted on a supporting frame so as to cause the first operation member to be displaced in a straight line.

11. The portable terminal of claim 3, wherein the first moving unit includes:
   a base connected to the lower slide member; and
   the link member connected to the base at a first connecting point.

12. The portable terminal of claim 11, wherein the first moving unit includes a tilting portion configured to erect the upper body with respect to the lower body at a predetermined angle in the open position, and the tilting portion includes a hinge configured to pivotally connect the lower slide member to the base so that the lower slide member is tiltable with respect to the base.

13. The portable terminal of claim 11, wherein the lower body includes a recess portion configured to receive the upper body as the upper body is moved from the closed position to the open position, and
   wherein the first moving unit is mounted on the recess portion.

14. The portable terminal of claim 13, further comprising a cover located at an outer periphery of the recess portion, the cover being configured to cover the first moving unit when the upper body is in the closed position.

15. The portable terminal of claim 14, wherein the cover is located on a lower surface of the lower slide member, the cover being inserted into the lower body when the upper body is lowered to the open position.

16. The portable terminal of claim 3, wherein the slide module further includes an elastic force supply unit disposed between the upper slide member and the lower slide member, and configured to supply an elastic force to the upper and lower slide members.

17. The portable terminal of claim 3, wherein the slide module includes an elastic force supply unit configured to provide an elastic force to the upper and lower slide members when the slide member performs a sliding motion.

18. The portable terminal of claim 17, wherein the first moving unit includes a spring configured to provide a restoration force to lift the upper body when the upper body is moved between the open position and the closed position, and
   wherein the elastic force supply unit is configured to have the elastic force that is greater than the restoration force of the spring.

* * * * *